United States Patent [19]
Walance et al.

[11] Patent Number: 5,621,782
[45] Date of Patent: Apr. 15, 1997

[54] TEST INTERFACE ADAPTER EMULATING ON TEST TRUNK INTERFACE FOR NON-STANDARD CENTRAL OFFICE SWITCH

[75] Inventors: Robert B. Walance, Newbury Park; Derek G. Foster, Thousand Oaks, both of Calif.

[73] Assignee: Harris Corporation, Melbourne, Fla.

[21] Appl. No.: 460,179

[22] Filed: Jun. 2, 1995

[51] Int. Cl.$^6$ ............................. H04M 1/24; H04M 3/08
[52] U.S. Cl. ................. 379/22; 379/10; 379/11; 379/12; 379/16; 379/17
[58] Field of Search ................. 379/10, 11, 12, 379/14, 15, 16, 17, 18, 22, 27, 29; 370/13, 85.1, 85.13

[56] References Cited

U.S. PATENT DOCUMENTS

| | | | |
|---|---|---|---|
| 4,314,110 | 2/1982 | Breidenstein | 379/15 |
| 4,430,530 | 2/1984 | Kandell | 379/10 |
| 4,558,188 | 12/1985 | Stuparits | 379/10 |
| 4,581,493 | 4/1986 | Gazzo | 379/12 |
| 4,839,917 | 6/1989 | Oliver | 379/33 |
| 5,103,473 | 4/1992 | Sullins | 379/29 |
| 5,166,925 | 11/1992 | Ward | 370/13 |

*Primary Examiner*—Wellington Chin
*Assistant Examiner*—Vijay Shankar
*Attorney, Agent, or Firm*—Charles E. Wands

[57] ABSTRACT

A test interface adapter allows a line-conditioning or test device, such as a direct access test unit (DATU), that is normally interfaced with a standard central office switch via a no-test trunk, to be coupled to and communicate with the respective ports of a test interface of a non-standard central office switch that is not equipped with a no test trunk, so that conditioning and/or testing of subscriber telephone lines served by such non-standard central office switch may be carried out. When so installed, the interface adapter of the present invention is operative to map signals at first interface ports, to which the non-standard central office switch is connected, to second interface ports to which the line conditioning/test device (e.g DATU) is connected, and vice versa. The port lead and signal mapping functionality of the interface allows the accessing device to communicate with the respective ports of what would otherwise be a non-compatible test interface of the central office switch, so that it may controllably condition and/or test line circuits of the 'NTT-less' central office switch.

31 Claims, 7 Drawing Sheets

TABLE 1

| CADENCE | FUNCTION | |
|---|---|---|
| CONTINUOUS | BUSY INTERFACE IF IN THIS CONDITION BEFORE ACCESS IS MADE | BL LEAD |
| CONTINUOUS | SEIZURE SUCCESSFUL | |
| 500ms/500ms | INTERFACE IN USE BY SECONDARY USER | |
| 250ms/250ms | INTERFACE FAILURE | |
| 250ms/250ms | DIALING PHASE | SL LEAD |
| 500ms/255ms | SUBSCRIBER LINE IS ON INTERCEPT | |
| 500ms/500ms | BUSY SUBSCRIBER LINE | |
| CONTINUOUS | IDLE SUBSCRIBER LINE | |
| 100ms/100ms | ERROR HAS OCCURED (CONGESTION) | |

*FIG. 11*

TABLE 2

| CADENCE | FUNCTION |
|---|---|
| CONTINUOUS ON | DIAL TONE |
| 1000ms ON/4000ms OFF | SUBSCRIBER RINGING (AVAILABLE) |
| 250ms ON/250ms OFF | SUBSCRIBER BUSY |
| 250ms ON/250ms OFF/750ms ON/250ms OFF | SUBSCRIBER INACCESSIBLE |

*FIG. 12*

TEST INTERFACE ADAPTER EMULATING ON TEST TRUNK INTERFACE FOR NON-STANDARD CENTRAL OFFICE SWITCH

FIELD OF THE INVENTION

The present invention relates in general to telephone systems, and is particularly directed to a test interface adapter that allows a line-conditioning or test device, such as a direct access test unit (DATU), that is normally interfaced with a first type of or standard central office switch via a no-test trunk, to be coupled to and communicate with the respective ports of a test interface of a second type or non-standard central office switch, that is not equipped with a no-test trunk, so that conditioning and/or testing of subscriber telephone lines served by such non-standard central office switch may be carried out.

BACKGROUND OF THE INVENTION

Figure 1:
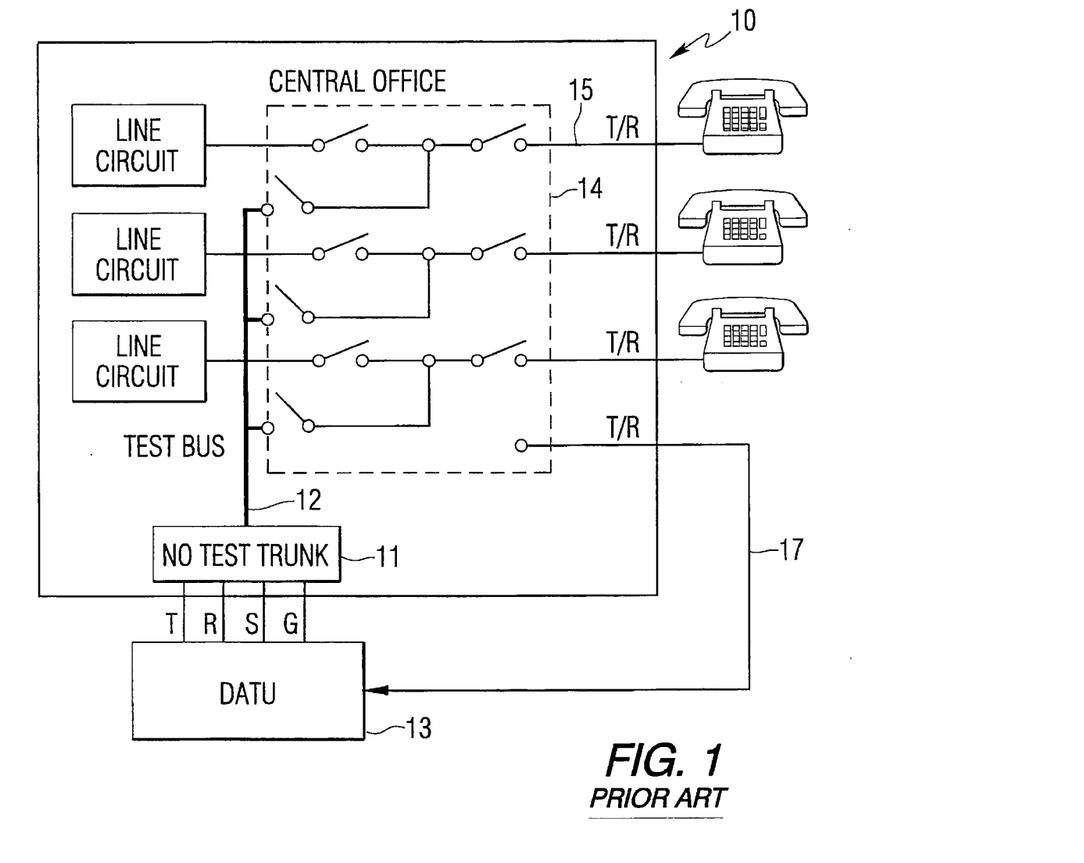
FIG. 1 diagrammatically illustrates a telephone central office switch having a no test trunk, through respective T, R, S and G leads of which a line-conditioning and test device, such as a direct access test unit, may be controllably connectable to a selected one of any of the line circuits served by the central office.

For the most part, telephone central office switch equipment employed throughout the United States, such as that diagrammatically illustrated at 10 in FIG. 1, is provided with a no test trunk, or NTT 11. NTT 11 is ported to an associated test bus 12 that is interfaced with the subscriber telephone lines served by the central office via a switch arrangement 14, as well as a set of access ports respectively comprising Tip (T), Ring (R), Sleeve (S) and Ground (G) leads, that allow for installation of a line-conditioning and/or test device 13. The central office access device is directly accessible by a craftsperson from a remote location, allowing the craftsperson to perform prescribed conditioning or test functions on any subscriber line 15.

Where the accessing device is a DATU, the craftsperson is able to test the line by invoking prescribed key combinations (sequences) from a craftsperson's telephone test set, without the need for participation by central office personnel. As a non-limiting example, the DATU may be of the type described in the U.S. patent to A. Chan et al, U.S. Pat No. 4,841,560 (hereinafter referred to as the '560 patent), entitled: "Direct Access Test Unit for Central Office," issued Jun. 20, 1989, and the disclosure of which is herein incorporated. Advantageously, the DATU described in the '560 patent is operative to respond to the craftsperson selectively keying in a specified audio tone combination from a telephone test handset, coupled to T/R pair 17 and to synthesize voice instructions to the craftsperson.

In some central office installations, the central office switch may not include an NTT, so that the above-described T, R, S and G leads are not available to directly connect to a piece of conditioning or test equipment, such as a DATU. Examples of such 'non-standard' central office switches include those that have installed in a variety of networks outside the United States, such as the Ericsson ARF 101/102 switch and the Standard Electric PC-1000 switch, currently employed in Brazilian telephone exchanges.

Figure 2:
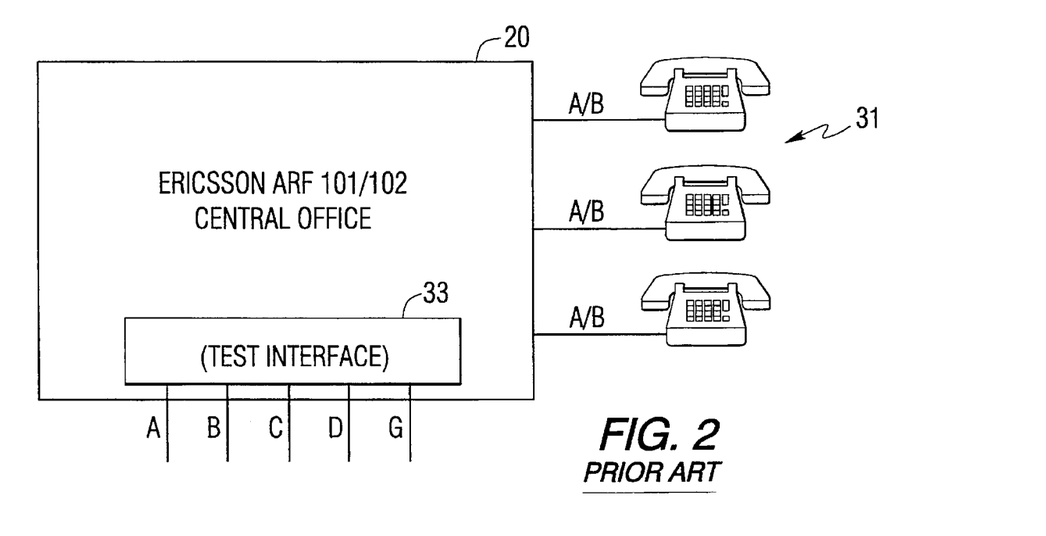
FIG. 2 diagrammatically illustrates an Ericsson ARF 101/102 central office switch.
Figure 3:
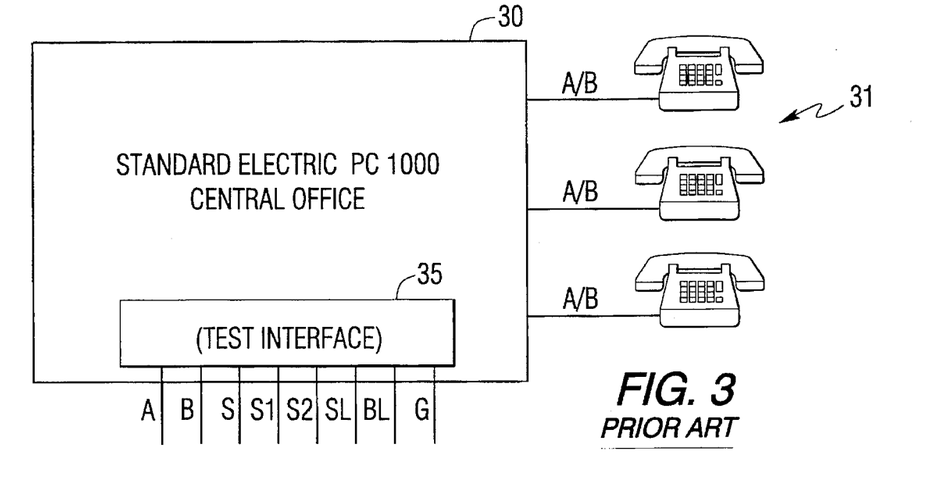
FIG. 3 diagrammatically illustrates a Standard Electric PC-1000 central office switch.

The Ericsson ARF 101/102 central office switch 20 is diagrammatically shown in FIG. 2 as being ported via A/B leads to respective line circuit equipments 31, and contains an access interface 33 having five signalling leads: A, B, C, D and G (ground). The Standard Electric PC-1000 central office switch is diagrammatically shown in FIG. 3 as being ported via A/B leads to respective line circuit equipments 31, and contains an access interface 35 having eight signalling leads: A, B, S, S1, S2, SL, BL and G (ground).

SUMMARY OF THE INVENTION

To solve the above described access port incompatibility problem that may exist with respect to certain types of central office switch equipment, such as the above referenced Ericsson and Standard Electric units, the present invention provides a test interface adapter, having first ports that are directly connectable to non-standard central office switch configurations, such as either of the above Ericsson ARF 101/102 switch and Standard Electric PC-1000 switch, and second ports that are directly connectable to a line-conditioning and or test device, such as a DATU, that would otherwise be directly ported to the T, R, S and G leads of no-test trunk.

When so installed, the interface adapter of the present invention is operative to map signals at its first (central office switch) interface ports, to which the non-standard central office switch is connected, to its second set of interface ports to which the line conditioning/test device (e.g DATU) is connected, and vice versa. The port lead and signal mapping functionality of the interface allows the accessing device to communicate with the respective ports of what would otherwise be a non-compatible test interface of the central office switch, so that it may controllably condition and/or test line circuits of the 'NTT-less' central office switch.

To this end, the interface adapter of the present invention contains a no-test trunk interface emulator unit, ported to respective T, R, S and G leads of the adapter and appearing to a central office switch access device, such as a DATU, as a no-test trunk. The NTT interface emulator unit includes a battery voltage conditioning unit, coupled to the tip and ring leads and, under the control of a resident microprocessor, provides NTT battery and battery reversal on the tip and ring leads. It is also operative to remove battery voltage from the tip and ring leads, and includes a battery current flow sensor for detecting an off-hook condition. The battery voltage conditioning unit is coupled through an A/B lead cut-through unit to the A and B leads of the central office switch interface ports of the adapter. The A/B lead cut-through unit controllably connects the A and B leads to respective lead connections to which the tip and ring leads are connected. The A and B leads are also coupled to a tone detector for monitoring respective tone cadences generated by the central office switch.

The no-test trunk interface emulator further contains an NTT sleeve termination and sleeve current level sensor unit, which is ported to the sleeve lead, and includes a terminating resistor, that is controllably placed in circuit with the sleeve lead in accordance with a sleeve lead termination input from the on-board control processor. This unit additionally includes a peak detector and a pair of threshold comparators, which controllably monitor the current flowing through the sleeve lead and provide a coded output to the microprocessor representative of the magnitude of the sleeve current, within specified ranges.

For replicating the necessary connections to a non-standard central office switch, the test interface adapter of the present invention contains a ground connection unit, which selectively places a ground condition of any of the C and D leads for an Ericsson ARF 101/102 central office switch, for example, and any of the S, S1 and S2 leads for a Standard Electric PC-1000 central office switch, for example. The test interface adapter further includes an SL and BL ground detector unit, coupled to each of the SL and BL leads, which monitors whether these leads are open or grounded. For the open or grounded respective conditions, prescribed logic levels are coupled to the adapter's control processor.

The adapter's micro-controller employs a table-based cadence detection software routine, to identify the cadence and thereby the associated function of a tone or pulse signal sequence applied by the central office switch to which the adapter is connected. Where the switch generates tone signals, as in the case of an Ericsson switch applying tone signals to the A and B leads, the logic level monitored by the micro-controller is that provided by a tone detection comparator which differentially monitors the A and B leads. Where the central office switch supplies on/off pulsing signals, as in the case of a Standard Electric switch applying open and ground to the SL and BL leads, the logic level is that provided by SL and BL lead pulsing activity detectors. Since the cadence detection mechanism is table-based, it readily accommodates changes in the cadences to which the adapter is required to respond.

The cadence detection mechanism comprises a cadence tokenizer, which translates the state of the monitored signals into a stream of tokens, a cadence parser, which identifies cadences from the stream of tokens, and one or more cadence tables, which the parser uses to identify cadences. The cadence tokenizer is the primary state machine for the cadence detection routine. Each cadence is expressed as a unique sequence of tokens. A token represents the state of the input signal being monitored, and the interval of time over which the input signal is measured. A 'pulse' token represents a relatively short period of time during which two state transitions occur (low/high/low or high/low/high). A 'level' token represents a longer period of time (e.g. on the order of several seconds or more) during which no state transitions occur.

The cadence parser is invoked by the cadence tokenizer to analyze the stream of tokens, representing the monitored signal state and returns a result whenever it recognizes one of a list of a predefined cadences. The parser searches a cadence table associated with the central office switch for an entry (transition) for the selected token. It indicates the new state the parser should enter as result of having seen that token in the current state.

The cadence tables list the sequences of tokens that make up each of the cadences recognized by the parser. There is one cadence table for each distinct set of cadences. (In the detailed description below, two cadence tables, respectively associated with an Standard Electric PC-1000 switch and an Ericsson ARF 102 switch, are provided as non-limiting examples.) The cadence table is pointed to by an entry in the parsing routine. Each cadence table accepts the current parser state and the token to be processed, and returns either the new parser state (for a non-terminal transition), a cadence result code (for a terminal state), or an error code (for an unexpected token).

DETAILED DESCRIPTION

Before describing in detail the test interface adapter of the present invention, it should be observed that the present invention resides primarily in what is effectively a prescribed set of conventional telephone signalling hardware components through which signal level conditions at the two respective sets of signalling ports, referenced above, are translated or mapped to each other, and an attendant supervisory microprocessor, that controls the operations of such components to effect the mapping. Consequently, the configuration of such components and the manner in which they are interfaced with other communication equipment of the telephone network have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

As described briefly above, the test interface adapter of the present invention has a first set of interface ports that are directly connectable to non-standard central office switch, such as either of the above-referenced non-standard Ericsson ARF 101/102 and Standard Electric PC-1000 central office switch equipment, and a second set of interface ports that are directly connectable to the T, R, S and G leads of a line conditioning/test device, such as a direct access test unit (DATU).

Figure 4:
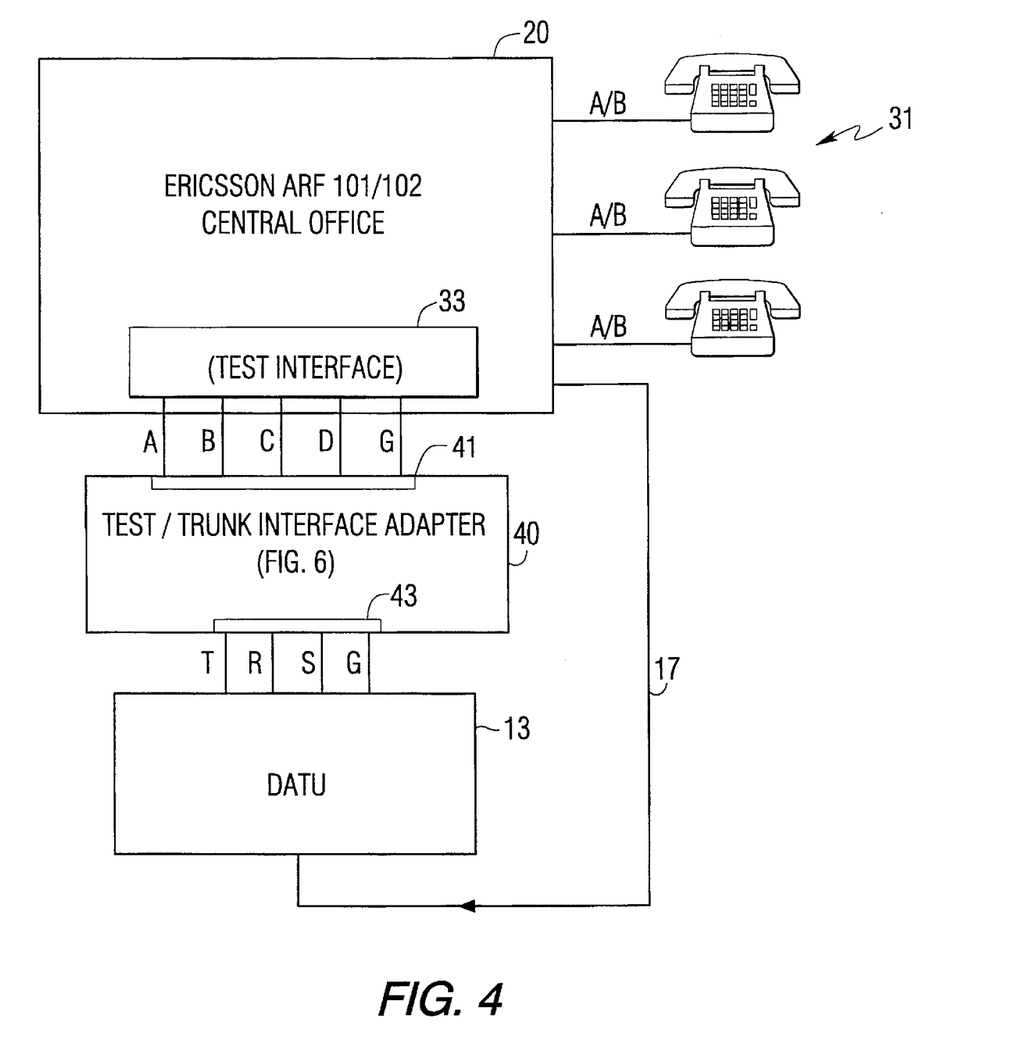
FIG. 4 shows a test interface adapter according to the present invention installed between a DATU and A, B, C, D and G leads of an Ericsson ARF 101/102 central office switch 20.
Figure 5:
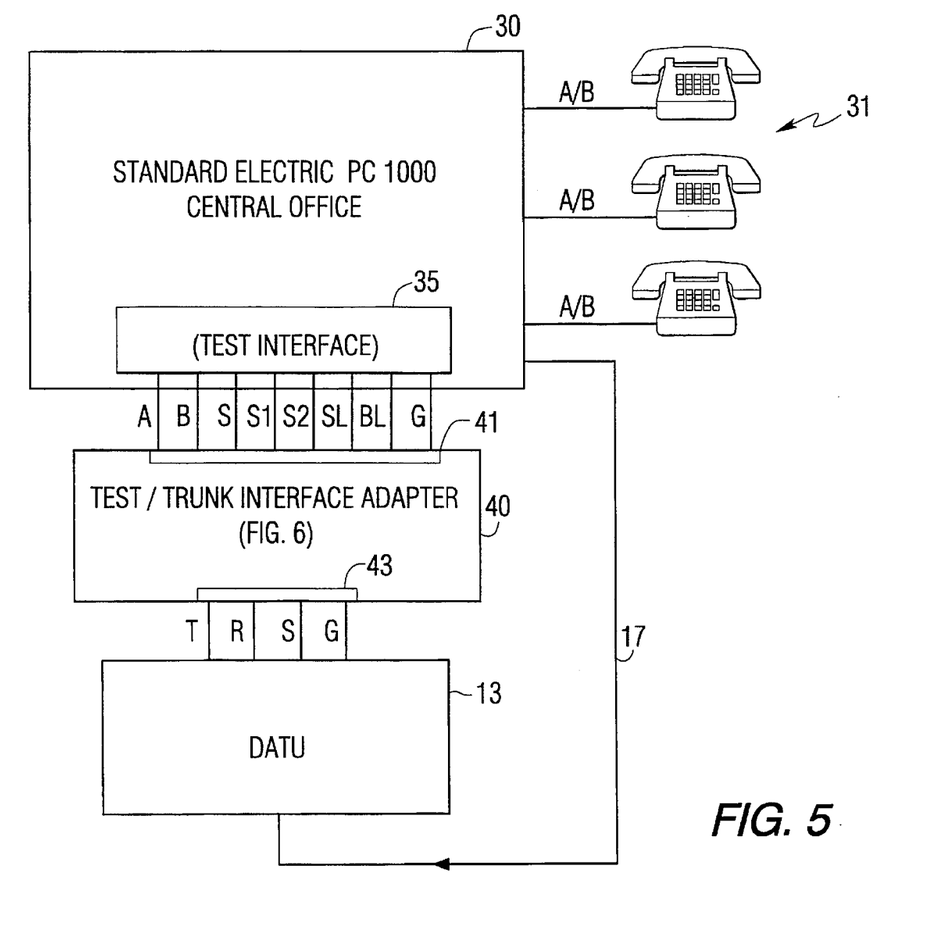
FIG. 5 shows a test interface adapter installed between a DATU and A, B, S, S1, S2, SL, BL and G leads of a Standard Electric PC-1000 central office switch 30.

FIG. 4 shows a test interface adapter 40 according to the present invention installed between a DATU 13, as a non-limiting example of a line conditioning/test device, and the A, B, C, D and G leads of an Ericsson ARF 101/102 central office switch 20, while FIG. 5 shows the test interface adapter 40 installed between DATU 13 and A, B, S, S1, S2, SL, BL and G leads of a Standard Electric PC-1000 central office switch 30. For either installation, the test interface adapter 40 has a first set of interface ports 41, selected ones of which connect directly to the appropriate central office switch leads, and second interface ports 43 that connect directly to the respective T, R, S and G leads of the DATU 13. When so installed, the adapter 40 maps signals at the central office switch ports 41 to the DATU ports 43 and vice versa. This mapping allows the DATU 13 to be directly accessible by a craftsperson and test any subscriber line 31 (by invoking specified key sequences) from a craftsperson's telephone test set, as described above).

Figure 6:
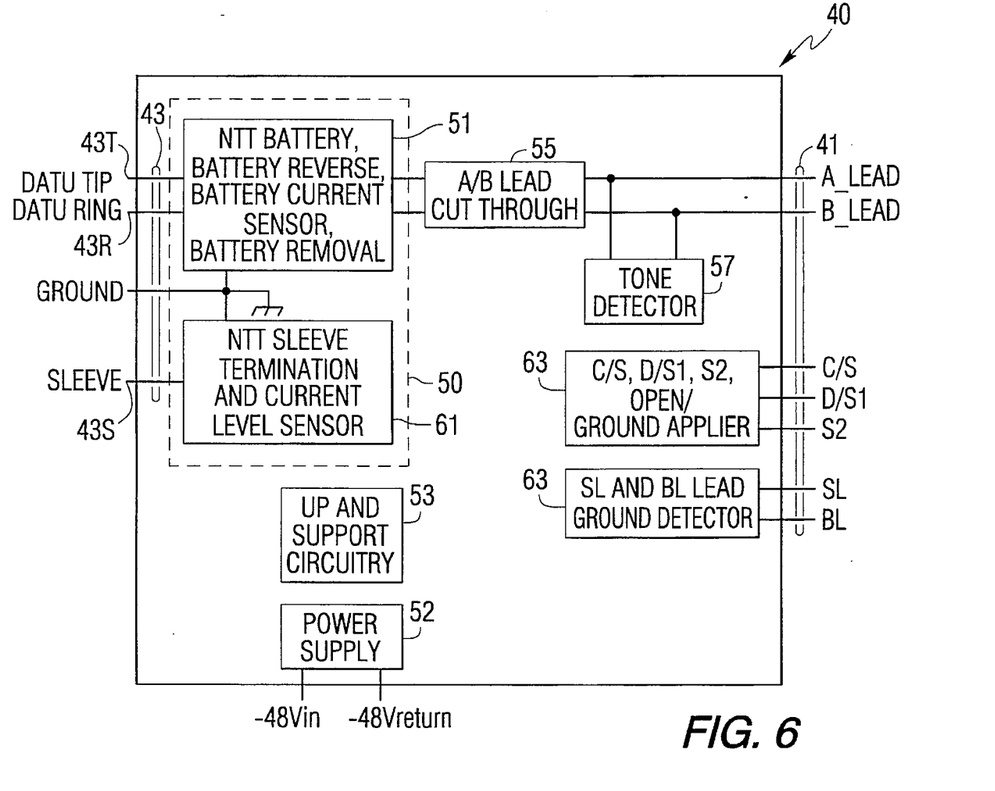
FIG. 6 shows the internal signal mapping components of the interface adapter of the present invention.

Referring now to FIG. 6, the internal signal mapping components of the interface adapter of the present invention are diagrammatically illustrated as comprising a no-test trunk interface emulator unit 50, which is ported to the respective tip (T), ring (R), sleeve (S) and ground (G) leads of interface port 43 and appears to an access device, such as a DATU, as a no-test trunk (NTT). For this purpose, NTT interface emulator unit 50 includes a battery voltage conditioning unit 51 (shown in detail in FIG. 7, to be described), which is coupled to the tip and ring leads 43T and 43R of the second set of interface ports 43.

Battery voltage conditioning unit 51 is operative, under the control of an attendant microprocessor (microcontroller) 53, to provide NTT battery and battery reversal on the tip and ring leads 43T and 43R, respectively. Microcontroller 53 may comprise a commercially available 80C31 microprocessor, having an associated read only memory (ROM) in which the processor's operating firmware is stored, and random access memory (RAM) for general data/parameter storage. The interface emulation software executed by the micro-controller in the course of its responding to inputs to and operating the various components of the adapter may be understood from the description of the operation of the adapter, set forth hereinafter.

Battery voltage conditioning unit 51 is also operative to remove battery voltage from the tip and ring leads, and includes a battery current flow sensor for detecting an off-hook condition. A power supply unit 52 operates on standard central office battery ±48 volts (Vin/Vreturn), and converts it to regulated ±5 VDC for powering the electronic components of the adapter. (The interconnect leads of an internal microprocessor control bus through which microprocessor 53 is interfaced with the respective circuit components of the adapter are not shown in FIG. 6 in order to avoid unnecessary cluttering of the drawing. Instead, the respective communication/signalling leads are set forth in detail in FIGS. 7 and 8, which schematically illustrate the details of the respective circuit components of the adapter to which control processor 53 is connected.)

The battery voltage conditioning unit 51 is further coupled to through an A/B lead cut-through unit 55 to the A and B leads of the central office switch interface ports 41. The A and B leads of the above-referenced Ericsson and Standard Electric central office switches are 'roughly equivalent' to tip and ring, respectively. The A and B leads are coupled to an A/B lead cut-through unit 55, schematically shown in FIG. 7, which controllably connects the A and B leads of port 41 to respective lead connections, to which the tip and ring leads of interface port 43 are connected, as will be described.

Figure 7:
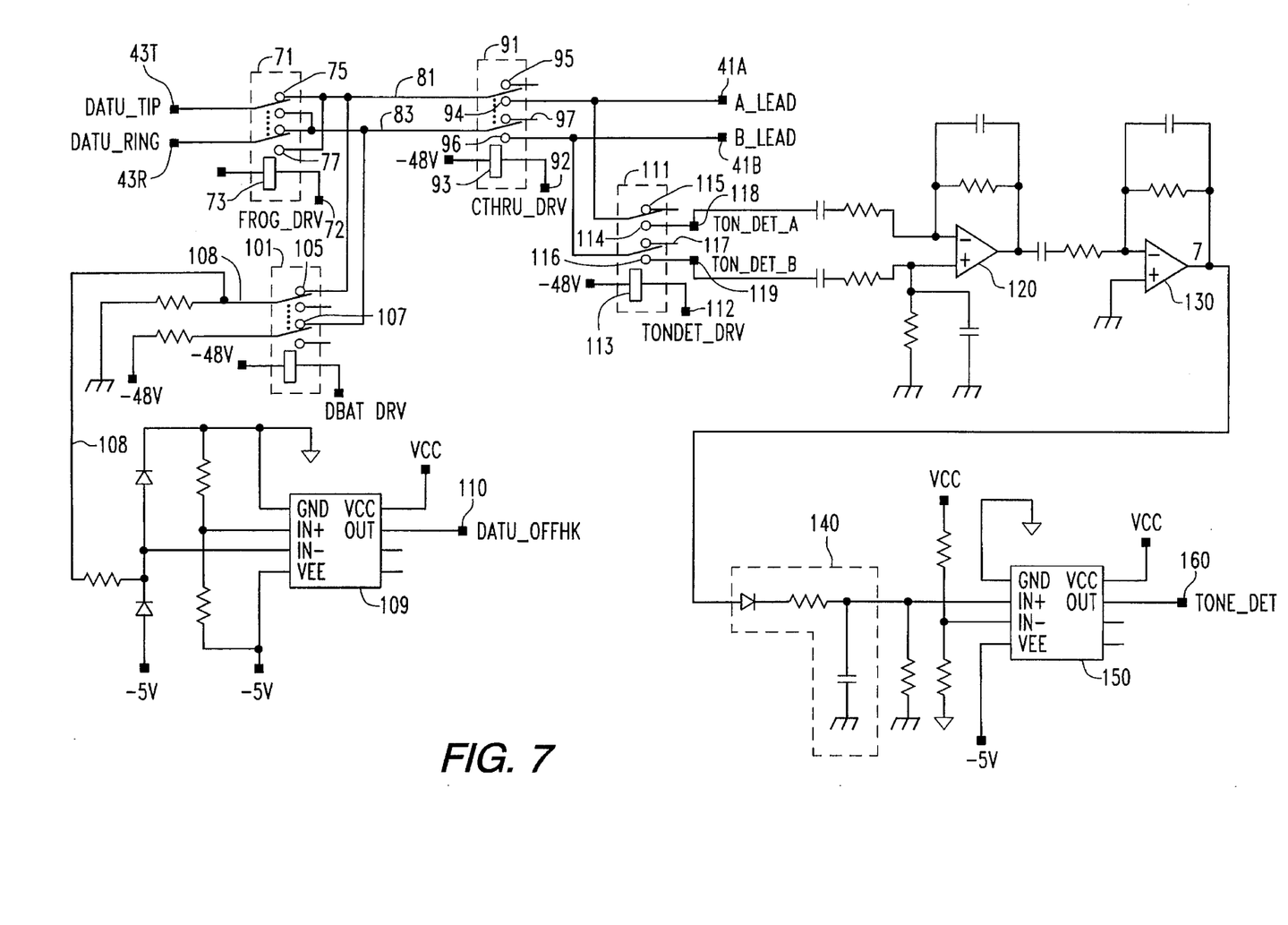
FIG. 7 schematically illustrates the circuitries of the battery voltage conditioning unit, A/B cut through unit, and tone detector unit of the interface adapter of FIG. 6.

Also coupled to the A and B leads is a balanced tone detector unit 57, shown in detail in FIG. 7, which is operative to detect tones placed on the A and B leads from the central office switch and to supply respective logic output levels (0) and (1) to the micro-controller in the presence and absence of tone. These logic levels are analyzed by a table-based cadence detection software routine, to be described, employed by the micro-controller to identify the cadence and thereby the associated function of a tone sequence applied by the switch. An advantageous feature of the use of a table-based cadence detection mechanism is its ability to readily accommodate changes in the tone cadences to which the adapter is to respond.

Figure 8:
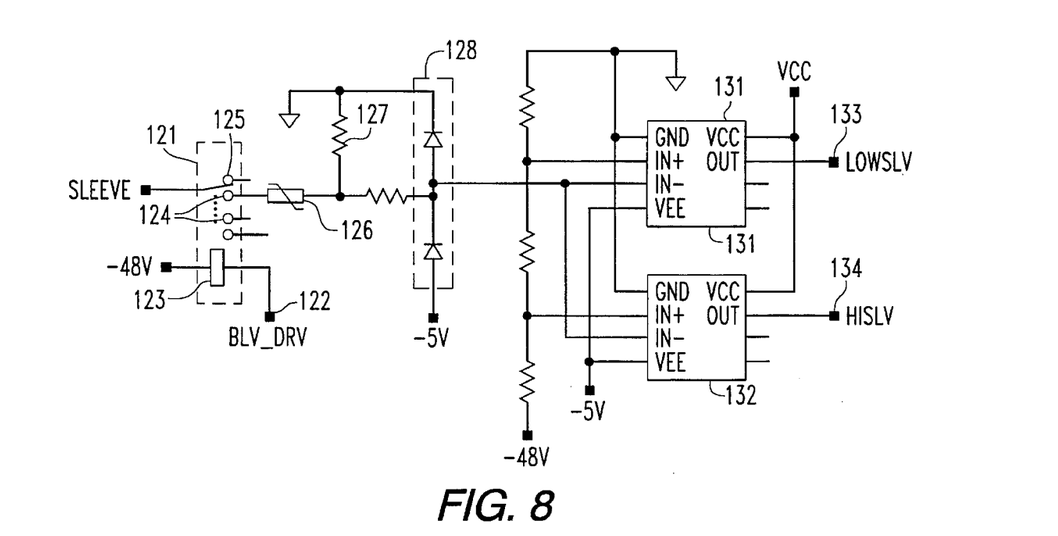
FIG. 8 schematically illustrates an NTT sleeve termination and current level sensor unit of the interface adapter of FIG. 6.

The no-test trunk interface emulator unit 50 of the test interface adapter of FIG. 6 further includes an NTT sleeve termination and sleeve current level sensor unit 61, schematically shown in FIG. 8, which is ported to the sleeve lead 43S of the set of interface ports 43. NTT sleeve termination and sleeve current level sensor unit 61 includes a terminating resistor, that is controllably placed in circuit with the sleeve lead in 43S of interface port 43, in accordance with a sleeve lead termination input from the control processor 53. Unit 61 further includes a pair of threshold comparators, which controllably monitor the current flowing through the sleeve lead and provide a coded output to the microprocessor 53, representative of the magnitude of the sleeve current, within specified ranges, as will be described.

Figure 9:
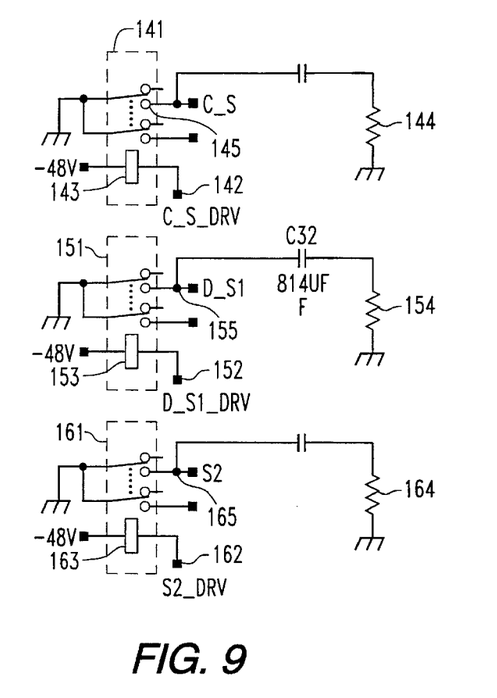
FIG. 9 schematically illustrates a ground connection unit of the interface adapter of FIG. 6.

For replicating the necessary connections to a non-standard central office switch, the test interface adapter additionally includes a ground connection unit 63, schematically illustrated in FIG. 9, which is operative under microprocessor control to selectively place a ground condition of any of the C and D leads of central office switch interface port 41 (for an Ericsson ARF 101/102 central office switch, for example), and any of the S, S1 and S2 leads of interface port 41 (for a Standard Electric PC-1000 central office switch, for example).

Figure 10:
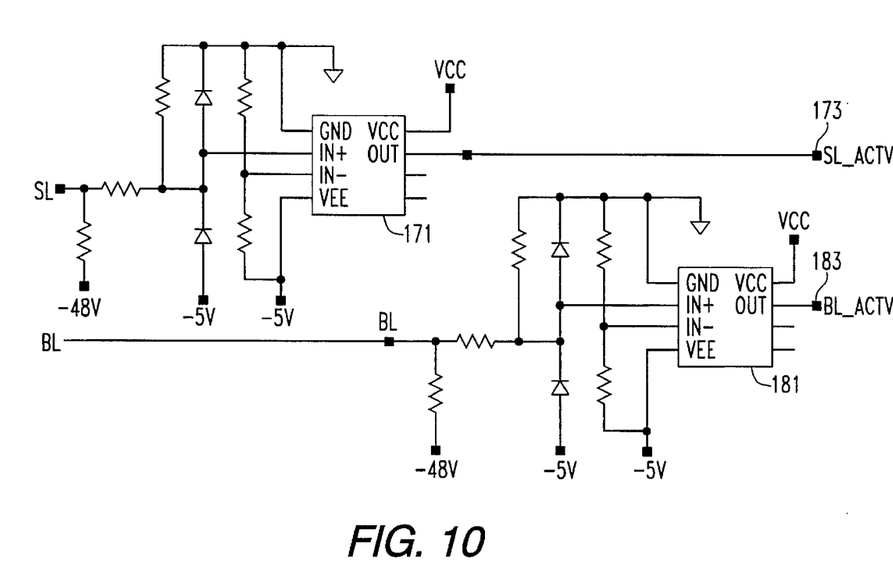
FIG. 10 schematically illustrates an SL and BL ground detector unit of the interface adapter of FIG. 6.

Finally, the test interface adapter comprises an SL and BL ground/open detector unit 65, shown schematically in FIG. 10, which is coupled to each of the SL and BL leads of central office switch interface port 41, and is operative to monitor whether these leads are open or grounded. The SL and BL leads are status leads employed by the Standard Electric switch to provide subscriber line offhook/onhook status and test interface status. For the open or grounded respective conditions of the SL and BL leads, prescribed logic levels are coupled to the microprocessor 53. During cadence detection, the on/off times of these logic levels are compared by the microcontroller with on/off patterns stored in an associated cadence table.

Referring now to FIG. 7, the circuitry of battery voltage conditioning unit 51 is schematically shown as comprising a first, polarity relay 71, having a winding 73 and normally closed contacts 75 and 77 which, in the de-energized state of winding 73 couple the T lead 43T and the ring lead 43R of port 43 in circuit with respective leads 81 and 83. When relay winding 73 is energized by microprocessor 53 applying a FROG-DRV signal on terminal 72, normally closed contacts 75 and 77 cross-connect to leads 83 and 81. Relay 71 is employed to provide normal and reversed battery voltage (−48 V and ground (GND)) to the tip and ring leads, and to allow for TIP to A and RING to B, or TIP to B and RING to A connection.

Leads 81 and 83 are connected to normally closed contacts 95 and 97 of a second 'A/B cut-through' relay 91, and to the normally closed contacts 105 and 107 of a third 'battery removal' relay 101. Relay 91 has normally open contacts 94 and 96 coupled directly to the A and B leads 41A and 41B of interface port 41 and to the normally closed contacts 115 and 117 of a fourth, 'tone detector' relay 111. The winding 93 of relay 91 is controllably energized by a cut-through signal CTHRU_DRV on control terminal 92 from microprocessor 53.

The third, battery removal relay 101 has its winding 103 controllably energized by a DBAT_DRV signal from microcontroller 53. In its de-energized state, as shown, relay 101 couples −48 V battery voltage and ground through normally closed contacts 105 and 107 to leads 81 and 83, respectively. When winding 103 is energized, relay 101 opens or removes the battery connection to leads 81 and 83.

In addition, normally closed contact 105 is coupled over lead 108 to an off-hook threshold comparator 109, which is operative to sense the flow of battery current in the tip-ring loop, indicating that the accessing device is off-hook. When the accessing device (e.g. DATU) goes off-hook, the voltage on lead 108, which is coupled to the tip lead, is pulled low, changing the state of the input to comparator 109, and changing the DATU_OFFHK logic level state on its output terminal 110, and thereby signalling an off-hook condition to the microprocessor 53.

The fourth, 'tone detector' relay 111 has normally open contacts 114 and 116 coupled to tone detect A and B terminals 118 and 119, respectively. The winding 113 of relay 111 is controllably energized by a tone detect signal TONDET_DRV on control terminal 112 from microprocessor 53. Tone detect A and B terminals 118 and 119 are respectively coupled to complementary inputs of a differential amplifier 120, the which is coupled in series with an amplifier 130. Amplifiers 120 and 130 amplifier the tone signal, which is then coupled to a peak detector 140. The peak detector 140 is coupled in turn to a threshold comparator 150, the output of which is supplied to a tone detection terminal 160, to provide a tone detection logic level TONE_DET to microprocessor 53.

The NTT sleeve termination and current level sensor unit 61 of no-test trunk interface emulator unit 50 is schematically shown in FIG. 8 as comprising a fifth, 'sleeve termination' relay 121, having a winding 123, and a normally closed contact 125 coupled to sleeve lead port 43S. A normally open contact 124 is coupled through a varistor 126 to a termination resistor 127 and, via a protection circuit 128, to a pair of threshold comparators 131 and 132.

Threshold comparator 131 has an output terminal 133 from which a low sleeve current logic level signal LOWSLV is provided, while threshold comparator 132 has an output terminal 134 from which a high sleeve current logic level signal HSLV is provided. So long as the sleeve current does not exceed the threshold value associated with a respective comparator, the comparator output logic level is a first binary value ('0'). When the sleeve current exceeds the threshold value associated with a respective comparator, its output logic level changes state (to a '1').

Thus, when the sleeve current does not exceed the threshold value of comparator 131, both comparator outputs are a logical '0'. If the sleeve current exceeds the threshold value associated with comparator 132, both comparator outputs are a logical '1'. If the sleeve current exceeds the threshold value associated with comparator 131, but not comparator 132, namely the sleeve current falls between the thresholds of the two comparators, the LOWSLV logic level is '1' and the HSLV logic level is '0'. The processor 53 monitors this pair of logic level values (HSLV, LOWSLV) to determine the range of magnitude of the sleeve current.

The ground connection unit 63 is diagrammatically illustrated in FIG. 9 as having a set of relays 141, 151 and 161, which are respectively coupled to receive microprocessor-based control signals C_S_DRV, D_S1_DRV and S2_DRV at the control terminals 142, 152 and 162 of windings 143, 153 and 163, to selectively place a ground condition of any of the C and D leads 41C/S and 41D/S1 of central office switch interface port 41 (for an Ericsson ARF 101/102 central office switch, for example), and any of the S, S1 and S2 leads 41C/S, 41D/S1 and 41S2 of interface port 41 (for a Standard Electric PC-1000 central office switch, for example).

With the windings 143, 153 and 163 normally de-energized, their associated normally open contacts 145, 155 and 165, to which the leads 41C/S and 41D/S1 of central office switch interface port 41, and 41S2 of interface port 41 are connected, are effectively open (with the coupling of respective noise/spike protection capacitor—resistor circuits 144, 154 and 164 to ground, as shown). When the windings 143, 153 and 163 are energized, leads 41C/S and 41D/S1 of central office switch interface port 41, and 41S2 of interface port 41 coupled through the operated relay contacts to ground.

The status lead SL and BL ground/open detector unit 65 is schematically shown in FIG. 10 as comprising respective threshold comparators 171 and 181, to the inputs of which leads 41SL and 41BL are respectively coupled. Threshold comparator 171 has an SL_ACTV output terminal 173, the logic level of which is a first binary state (e.g. high) in response to a grounded condition on lead 41SL. If lead 41SL is open, the logic level of SL_ACT output 173 is low. Similarly, threshold comparator 181 has a BL_ACTV output terminal 183, the logic level of which is a first binary state (e.g. high) in response to a grounded condition on lead 41BL. If lead 41BL is open the logic level of BL_ACT output 183 is low. Thus, for either of these open or grounded conditions, prescribed logic levels (high and low) are coupled to microprocessor 53 via terminals SL_ACT and BL_ACT.

OPERATION

In order to facilitate an understanding of the operation of the interface adapter of the present invention, the actions of the various components of the detailed schematic of the adapter of FIGS. 7–10 will now be described for the respective states of a direct access test unit, as a non-limiting example of an access device, in the course of the DATU's seizure, testing/conditioning, and release of a line via the access ports of each of 1—a standard central office switch having a no-test trunk, 2—an Ericsson ARF 101/102 central office switch unit, and 3—a Standard Electric PC 1000 central office switch unit. Although a DATU, such as that described in the previously referenced '560 patent, is customarily capable of generating dialed digits into the no-test trunk as either tone or pulse signals, the dial pulse mode will be presumed in the following description, since each of the non-standard Ericsson and Standard Electric switches described herein are dial pulse only devices. For each type of equipment, the T,R,S,G leads of the DATU will have been attached directly to respective ones of a set of T,R,S,G leads (of either an NTT, in the case of a standard central office switch, or those of the interface port 43 of the adapter of the present invention). Also, where the adapter is installed, its first interface port 41 will have been connected to the appropriate leads of the NTT-less central office switch (A,B,C,D,G leads in the case of an Ericsson ARF device, and A,B,S,S1,S2,SL,BL,G leads for a Standard Electric device). Since the DATU is configured for operation with an NTT, the manner in which the adapter emulates these operations of the NTT expected to be seen by the DATU will first be described, followed by a description of the mapping of NTT-based steps into appropriate signals for the non-standard switch leads.

IDLE STATE

On the DATU interface port side of the adapter, with the DATU attached and in the default (idle) state, the NTT would be supplying battery (−48 V) to the ring (R) lead and ground (G) to the tip (T) leads. In addition, the NTT applies an open to the sleeve (S) lead. As described above and as shown in FIG. 7, this condition is emulated to the DATU by the normally closed contacts 75, 77 and 105, 107 of respective relays 71 and 101, and by the normally open contact 125 of relay 121, each relay winding being in its default (de-energized) state. In the idle state, the DATU applies an open across each of the tip, ring and sleeve leads, so that no current is drawn through these leads in the default condition shown.

On the switch interface port side of the adapter, in the case of an Ericsson unit, each of the central office switch and the user supplies an open to the A and B leads. As shown in FIG. 7, this open condition of the A and B leads is emulated by the normally open contacts 95 and 97 of A/B cut-through relay 91. The central office switch also applies battery to the C and D leads, while the user places an open on each of the C and D leads. This default open condition on the user side of the adapter is emulated by the normally open contacts of relays 141 and 151.

In the case of a Standard Electric unit, each of the central office switch and the user supplies an open to the A and B leads. Again, as shown in FIG. 7, this open condition of the A and B leads is emulated by the normally open contacts 95 and 97 of A/B cut-through relay 91. In addition, each of the switch and the user applies an open to each of the S1 and S2 leads. This default open condition on the user side of the adapter is emulated by the normally open contacts of relays 151 and 161 of FIG. 9. The switch also applies an open to each of the BL and SL leads. As described above with reference to FIG. 10, this default open condition on the BL and SL leads is indicated to the processor 53 as a logic level '0' on SL_ACTV and BL_ACTV terminals. The switch further applies battery to the S lead, which is placed in an open condition by the user. As shown in FIG. 9, this latter condition is emulated by the normally open contact of relay 161, to which the C/S lead is connected.

PRE-SEIZURE STATE

In preparation for seizure of the line, on the DATU interface port side of the adapter, the DATU will initially measure the voltage on the sleeve lead to ensure that the NTT sleeve lead is open. For the present default-to-idle condition described above, the normally open contact 125 of relay 121 provides an open sleeve lead S condition to the DATU. The DATU then asserts a high sleeve condition on the sleeve lead and measures the voltage on the tip and ring leads to ensure that these leads are at their proper levels and polarity.

As pointed out above, with reference to FIG. 7, the requisite voltage values for tip and ring are coupled through the normally closed contacts of relays 71 and 101. The DATU will customarily accept a multi (e.g. seven) digit subscriber line number.

On the switch interface port side of the adapter, in the case of an Ericsson unit, the user would apply a ground to the C lead and loop closure from the A lead and to the B lead. (This loop closure may also be applied in the seizure state, described below.) To emulate this operation processor 53 responds to the DATU inputs described above and applies a low to the C/S_DRV input to relay 141 of FIG. 9, thereby energizing winding 143, so as to close its normally open relay contact and couple a hard ground applied by the C/S terminal, and thereby inform the switch that the 'user' (here the DATU) has entered the pre-seizure state.

Figure 11:
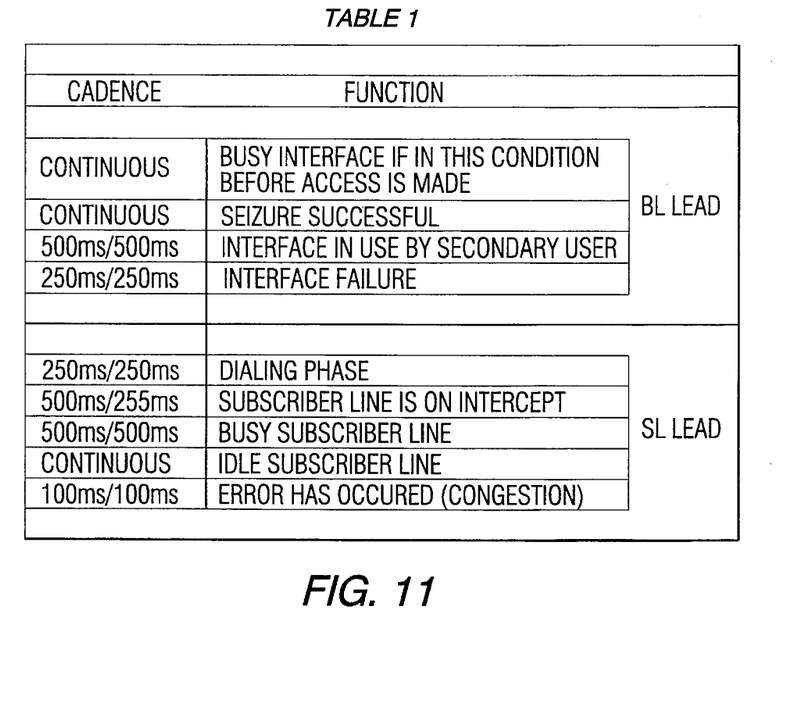
FIG. 11 contains a cadence Table 1, associated with the cadence detection mechanism for a Standard Electric central office switch.

In the case of a Standard Electric unit, the user would monitor the status BL lead to determine interface status, as indicated in TABLE 1 of FIG. 11. If not in an idle condition, the user would go to the idle state. The user would then apply ground to each of the S, S1 and S2 leads, as well as effecting a loop closure from the A to the B leads. To emulate grounding the S, S1 and S2 leads, processor 53 applies a low drive signal level to each of the C/S_DRV, D/S1_DRV, and S2_DRV inputs to relays 141, 151 and 161 of FIG. 9, thereby coupling a hard ground level to each of the S, S1 and S2 leads. In order to effect a loop closure of the A and B leads processor 53 drives the CTHRU_DRV control terminal 92 to winding 93 of cut-through relay 91 (FIG. 7) low, thereby allowing the loop closure, that will be present on 43T and 43R, to be applied to 41A and 41B.

SEIZURE STATE

To seize the line, on the DATU interface port side of the adapter, the DATU will apply loop closure of the tip and ring leads. As described previously, loop closure of the tip and ring leads is detected by comparator 109, which causes a change in the DATU_OFFHK logic level state on its output terminal 110, and thereby signalling an off-hook condition to the microprocessor 53. The high sleeve condition is detected by threshold comparator 132 which causes the logic level on output terminal 134 to go high ('1') which is read by processor 53 as a high sleeve condition.

The DATU now expects the NTT to which it thinks it is connected to invoke (within a prescribed time interval (e.g. seven seconds) a battery reversal on tip and ring. To see battery reversal, processor 53 applies an FROG_DRV signal to control terminal 72 of relay 71 (when working with the Ericsson ARF 101/102 unit only) and a CTHRU_DRV signal to activate relay 91.

The seizure state for an Ericsson ARF 101/102 unit involves the switch applying ground on the A lead and battery on the B lead. With cut-through relay 91 and frog relay energized, the application of battery on the TIP lead is detected by the DATU.

The seizure state for a Standard Electric unit is similar to that for an Ericsson ARF 101/102 unit as described above, except that it involves an application of ground on the B lead and battery on the A lead. Similarly, this condition is detected by the DATU as a battery reversal.

In addition, the switch applies interrupted ground on the BL lead, as shown in cadence TABLE 1 of FIG. 11, thereby indicating interface status. Further, the switch applies interrupted ground on the SL lead, as a cadence set forth in TABLE 1 of FIG. 11, to indicate dialing status. These cadence signals are read by processor 53 on the BL_ACTV and SL_ACTV terminals 173 and 183, respectively, of threshold comparators 131 and 133, as described above, and compared with listings in the cadence table by the cadence detection routine to be described.

DIALING DIGITS STATE

Once the line has been seized, the DATU dials digit pulses by interrupting the closed loop path across the tip and ring leads of interface port 43. With the cut-through relay 91 energized, this assertion of digit pulses on the tip and ring leads is also asserted onto the A and B leads of interface port 41 for each of the Ericsson and Standard Electric switches.

DIGITS ACCEPTED STATE

After dialing the digits of the line under test, for a normal NTT connection the DATU expects the NTT to apply closure from the sleeve lead to ground, and to re-reverse or remove battery on the tip and ring leads, and customarily waits up to seven seconds for the NTT to re-reverse or remove battery. To effect the sleeve lead to ground closure, a low is asserted on the SLV_DRV control terminal 122 of relay 121, thereby effecting a closure through varistor 126 and sleeve lead terminating resistor 127 to ground. When the DATU detects battery removal or re-reversal on the tip and ring leads, it asserts low sleeve condtion on the sleeve lead, which is detected by threshold comparator 131 and provided as an output on LOWSLV terminal 133 to processor 53.

For an Ericsson switch, with the tone detect relay 111 energized, tone cadences are applied from the switch to the A and B leads, which are customarily interpreted by the user to ascertain the status of access, as set forth in TABLE 1 in FIG. 11. In addition, for a Standard Electric switch, the switch applies an uninterrupted ground to the SL lead.

METALLIC ACCESS STATE

The metallic access state is the target state of the test and conditioning equipment, so that the unit may test and/or condition the accessed line. Loop conditioning is performed in this state based upon commands invoked by the craftsperson. Once the craftsperson is finished, the DATU will be commanded to disconnect from the switch. With the dialed line having been accessed (by acceptance of the dialed digits, as described above), the DATU applies an open across the tip and ring leads, and then measures the voltage across tip and ring to determine whether the line is 'idle' or 'busy'.

For an Ericsson switch unit processor 53 asserts the following sequence of low and high signals on the D/S1_DRV input to relay 161: assert low for approximately one second (which grounds the D lead), assert high for approximately one-half second (which opens the D lead), assert low (which grounds the D lead). For a Standard Electric switch, no interface lead state changes are required. Also, relay 71 is de-energized to restore the TIP to A, and RING to B connection.

DISCONNECT STATE

For a normal NTT connection, prior to disconnect, the DATU asserts a high sleeve condition on the sleeve input, which causes the output on HSLV terminal 134 to processor 53 go high ('1'). In response to detecting this high level on terminal 134, processor de-energizes each of the relays 91, 101, 121, 141, 151 and 161. De-energizing relay 121 opens the sleeve lead, to emulate the expected response to the DATU by an NTT. The DATU then verifies that the sleeve lead is open and transitions to the idle state. De-energizing relays 141, 151 and 161 places an open condition on each of the C/S and D/S1 and S2 leads. As described previously, for an Ericsson switch, with the C and D leads open, the unit is in the idle state. Similarly, for a Standard Electric switch, with the S, S1 and S2 leads open, the unit is in the idle state.

CADENCE DETECTION

As described briefly above, the adapter's microcontroller employs a table-based cadence detection software routine, to identify the cadence and thereby the associated function of a tone or pulse signal sequence applied by the central office switch to which the adapter is connected. Where the switch generates tone signals, as in the case of an Ericsson switch applying tone signals to the A and B leads, the logic level being monitored by the microcontroller 53 is that provided at the TONE_DET output terminal 160 of tone detection comparator 150 of FIG. 7. On the other hand, where the central office switch supplies on/off pulsing signals, as in the case of a Standard Electric switch applying open and ground to the SL and BL leads, the logic level being monitored by processor 53 is that provided at each of the SL_ACTV and BL_ACTV output terminals 173 and 183 of comparators 171 and 181, respectively, of FIG. 10. Since the cadence detection mechanism is table-based, it readily accommodates changes in the cadences to which the adapter is required to respond.

More particularly, the cadence detection mechanism employed by the test interface adapter of the present invention is divided into three parts: 1—a cadence tokenizer, which translates the state of the monitored signals into a stream of tokens; 2—a cadence parser, which identifies cadences from the stream of tokens; and 3—one or more cadence tables, which the parser uses to identify cadences.

A cadence itself is a timed pattern of high and low levels on a prescribed terminal being monitored—either the TONE_DET output terminal 160 of tone detection comparator 150 of FIG. 7, in which case it represents an in-band call progress tone (such as a busy signal), or one of the SL_ACTV and BL_ACTV output terminals 173 and 183 of comparators 171 and 181, respectively, of FIG. 10. The cadence detection mechanism is configured for a particular central office switch and input signal type. As a non-limiting example, the following sequence configures the cadence detector for the above-referenced Standard Electric central office switch.

| | | |
|---|---|---|
| MOV A, #CAD_PC1000_SL LEAD) | | ; SELECT PC-1000 (SL |
| CALL CAD_CONFIG CONFIGURATION | | ; SET DETECTOR |
| CALL CAD_START DETECTOR | | ; START CADENCE |
| Once started, the cadence detection routine operates continuously, posting a result every time it recognizes a defined cadence. The test interface adapter periodically obtains the results and acts on them: | | |
| CALL GET_CADENCE DETECTOR | | ; GET RESULT FROM |
| JZ IS_TRNK BUSY_90 RESULT | | ; RETURN IF NO |
| CJNE A, #SPC_BL_IDLE, TRUNK IDLE? | | IS_TRNK_BUSY_80; |
| CLR NTT_TRNK_BUSY AS AVAILABLE | | ; YES = FLAG TRUNK |
| SJMP IS_TRNK_BUSY_90 | | ; AND RETURN |

The GET_CADENCE function is operative to return a cadence result code if the detector has identified a cadence. It returns zero if detection is in progress, and a prescribed result code if the 'parser' has encountered a sequence of tokens that is not defined for the current configuration.

As noted above, the cadence detection mechanism of the present invention includes a cadence tokenizer, a cadence parser, and one or more cadence tables, employed by the parser to identify cadences. Each of these components is described below.

CADENCE TOKENIZER

The cadence tokenizer is the primary state machine for the cadence detection routine, and is invoked from the main program executed by processor 53. Each time the cadence tokenizer is invoked, it samples the active input and then passes a HIGH or LOW request code to the current state.

Each cadence recognized by the adapter is expressed as a sequence of tokens that uniquely identifies that cadence, A token actually represents two pieces of information: 1—the state of the input signal being monitored, and 2—the interval of time over which the input signal is being measured.

PULSE TOKEN

A pulse token represents a relatively short period of time during which two state transitions occur (low/high/low or high/low/high). The trailing edge of one pulse is the leading edge of its successor, so a high/low/high/low sequence is represented as a LOW pulse followed by a HIGH pulse. For purposes of providing a non-limiting illustration, pulse tokens may represent intervals of 100, 250, 500, 750, and 1000 milliseconds.

LEVEL TOKEN

A level token represents a relatively long period of time (e.g. on the order of several seconds or more) during which no state transitions occur. As non-limiting examples, level tokens may represent intervals of 2, 4, and 5 seconds. Periods of level tokens are cumulative, so that four seconds of a continuously LOW (L) signal yields two tokens: <L2S> (2 seconds (2S) continuous low (L)), followed two seconds later by <L4S> (4 seconds continuous low). Once the maximum interval for a particular level has been reached, its token is reissued every two seconds thereafter.

As an illustration, consider the following example of how nine seconds of continuous LOW signal is processed. Two seconds after the beginning of the LOW period, an <L2S> token is issued. Two seconds later (four seconds after the beginning of the LOW period), an <L4S> token is issued. One second later (five seconds after the beginning of the LOW period), an <L5S> token is issued. Two seconds later (seven seconds after the beginning of the LOW period), another <L5S> token is issued. Two seconds later (nine seconds after the beginning of the LOW period), a third <L5S> token is issued.

This cumulative-level and repeating-level process ensures that the cadence parser will be presented with a new token at a maximum interval of every two seconds, which serves to improve the overall responsiveness of the cadence detector. The tokenizer uses a multi-bit millisecond state timer and a multi-bit millisecond pulse width clock. The state timer is started whenever the tokenizer enters a new processing state; its expiration or timing out indicates that the tokenizer needs to issue a level token. The pulse width clock is started when the tokenizer detects a change in the state of the input, and is stopped when the input reverts to its initial state. It is used to determine the time component of the pulse token.

An internal routine computes pulse width (in milliseconds), and looks the value up in a HIGH_PULSE_TABLE (for a HIGH pulse) or LOW_PULSE_TABLE (for a LOW pulse). Each valid interval is represented by a lower bound and an upper bound, representing the tolerances of the measurement. If no matching entry is found, a prescribed error token is returned.

The cadence tokenizer generates the following pulse tokens:

| Token | Low Bound | High Bound | Description |
|---|---|---|---|
| L100 pulse | 80 | 120 | 100 ms low |
| H100 pulse | 80 | 120 | 100 ms high |
| L250 pulse | 200 | 300 | 250 ms low |
| H250 pulse | 200 | 300 | 250 ms high |
| L500 pulse | 400 | 600 | 500 ms low |
| H500 pulse | 400 | 600 | 500 ms high |
| H750 pulse | 600 | 850 | 750 ms high |
| H1000 pulse | 850 | 1200 | 1000 ms high |

The cadence tokenizer generates the following level tokens:

| Token | Min Interval | Description |
|---|---|---|
| L2S low | 2000 ms | 2 sec continuous |
| H2S high | 2000 ms | 2 sec continuous |
| L4S low | 3200 ms | 4 sec continuous |
| L5S low | 4800 ms | 5 sec continuous |

Cadence Parser

The cadence parser is invoked by the cadence tokenizer to analyze the stream of tokens, representing the state of the current input, and returns a result whenever it recognizes one of the predefined cadences. The sequence of operations executed by the cadence parser is as follows:

The parser first searches the cadence table for an entry for the selected token. The entry is called a transition. It indicates the new state the parser should enter as result of having seen that token in the current state. If the parser finds a non-terminal transition, then it is in the process of detecting a cadence, so that it updates the parser state and exits without posting a result.

If the parser finds a terminal transition, it has finished detecting a cadence. The result is posted, and the parser restarts itself. If the parser fails to find a transition for the token, it enters error recovery mode, in which the parser is reset to its starting state, and the token is reparsed. If the second attempt fails, the parser posts an "unrecognized cadence" result and remains in the starting state. The parser restarts itself following a successful terminal transition. If the parser was not already in the starting state, it is set to that state, and the cadence table is again searched for the current token (the one that terminated the previous parse). If the parser finds a non-terminal transition, the parser is advanced to the new state, effectively priming the next parse with the final token from the previous parse. This facilitates the recognition of both repeated cadences and changes in cadence, and is critical to the timely handling of in-band ringing and other cadences that involve level tokens.

Cadence Tables

Figure 12:
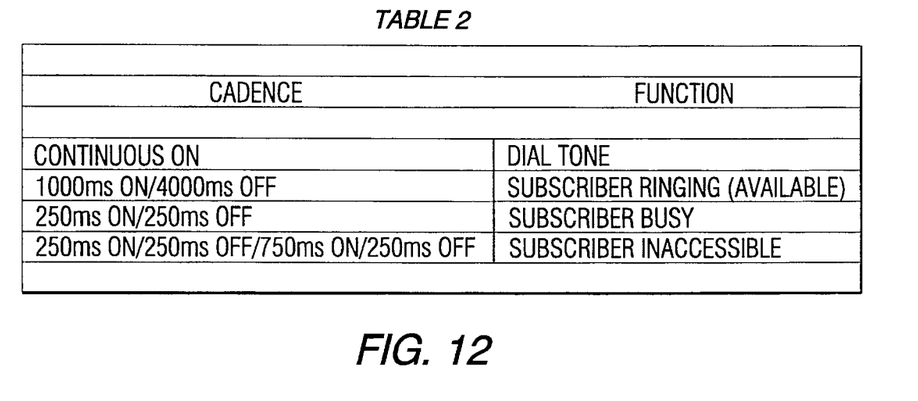
FIG. 12 contains a cadence Table 2, associated with the cadence detection mechanism for an Ericsson central office switch.

The cadence tables list the sequences of tokens that make up each of the cadences recognized by the parser. There is one cadence table for each distinct set of cadences. In the present embodiment, there are two cadence tables, shown in FIGS. 11 and 12, referenced previously, respectively associated with an SPC_TBL (for the Standard Electric PC-1000), and an ARF_TBL (for the Ericsson ARF 102). The current cadence table is pointed to by an entry in the parsing routine, and is established when the cadence detector is initially configured for the particular central office switch.

Each cadence table may be viewed as a function that accepts the current parser state and the token to be processed, and returns either the new parser state (for a non-terminal transition), a cadence result code (for a terminal state), or an error code (for an unexpected token). The cadence tables are structured as shown in the following non-limiting example for an Ericsson ARF 102 switch. It should be noted that the states given (states S00, S01 and S02) are merely illustrative and are not necessarily inclusive of all the states that would be encountered.

```
    ARF_TBL      EQU      $
    S00          EQU      $
                 DB       TOK_H250, S01
                 DB       TOK_L250, S04
                 DB       TOK_H750, S08
                 DB       TOK_L2S, S13
                 DB       TOK_L4S, S15
                 DB       TOK_L5S, ARF_CLOW
                 DB       TOK_H2S, ARF_CHIGH
                 DB       TOK_H1000, S16
                 DB       0
    ;
    ; State S01 - <H250> . . .
    ;
    S01          EQU      $-S00
                 DB       TOK_L250, S02
                 DB       0
    ;
    ; State S02 - <H250> <L250> . . .
    ;
    S02          EQU      $-S00
                 DB       TOK_H250, S03
                 DB       TOK_H750, S07
                 DB       0
```

Each state consists of a series of <TOKEN>, <ACTION> pairs terminated by a token value of zero (0). An <ACTION> may be either the index of the next state in the parse table or a parser result code. Parser tokens and result codes are defined globally. A non-terminal transition is represented by an <ACTION> code of the form Snn, representing a transition to parser state nn. The Snn symbol is defined, by means of an equate, to be the offset from the beginning of the table of the first <TOKEN>, <ACTION> pair for that state. State zero (S00) is the starting state.

A terminal transition is represented by an <ACTION> code of the form ARF_xxxx or SPC_xxxx, representing the parser result code for the specified cadence. These symbols, which are defined globally, and are distinguished from non-terminal transitions by being assigned values of 0F0H and greater, may take the following form:

```
    ;
    ; ERICSSON ARF 102 RESULT CODES.
    ;
    ARF_BUSY     EQU    0F0H    ; 250MS / 250MS / 250MS / 250MS
    ARF_INACC    EQU    0F1H    ; 250MS / 250MS / 750MS / 250MS
    ARF_RING     EQU    0F2H    ;1000MS / 4000MS
    ART_CLOW     EQU    0F3H    ; CONTINUOUS LOW
    ART_CHIGH    EQU    0F4H    ; CONTINUOUS HIGH
```

Each state in the parse table represents one or more partially-recognized (but as yet undistinguishable) cadences, and identifies the token (or tokens) that may be seen next. The following description is based on the ARF_TBL example given above:

In the non-limiting illustrated example, the parser begins in State S00. It recognizes a 250 ms HIGH pulse (TOK_H250), causing a transition to State S01. In State S01, the parser recognizes a 250 ms LOW pulse (TOK_L250), which causes a transition to State S02. The next token received by the parser must be another HIGH pulse, of either 250 ms or 750 ms duration (TOK_H250 or TOK_H750), which will, in turn, lead it to a subsequent state (not shown). Any other token will be treated as an unrecognized cadence (which may be used to drive the parser into error recovery mode).

As will be appreciated from the foregoing description, the above described access port incompatibility problem that may exist with respect to certain types of central office switch equipment, such as the above referenced Ericsson and Standard Electric units, is effectively remedied in accordance with the test interface adapter of the present invention, first interface ports of which are directly connectable to non-standard central office switch configurations, and second interface ports of which are directly connectable to a line-conditioning and or test device, such as a DATU, that would otherwise be directly ported to the T, R, S and G leads of no-test trunk.

When so installed, the test interface adapter of the present invention maps signals from the central office switch to the line conditioning/test device and vice versa. The port lead and signal mapping functionality of the interface allows the accessing device to communicate with the respective ports of what would otherwise be a non-compatible test interface of the central office switch, so that it may controllably condition and/or test line circuits of the 'NTT-less' central office switch. The adapter's micro-controller employs a table-based cadence detection software routine, to identify the cadence and thereby the associated function of a tone or pulse signal sequence applied by the central office switch to which the adapter is connected. Since the cadence detection mechanism is table-based, it readily accommodates changes in the cadences to which the adapter is required to respond.

Although we have shown and described an embodiment in accordance with the present invention, it is to be understood that the same is not limited thereto, but is susceptible to numerous changes and modifications as known to a person skilled in the art. Consequently, we do not wish to be limited to the details shown and described herein, but intend to cover all such changes and modifications as are obvious to one of ordinary skill in the art.

What is claimed:

1. A test interface adapter for enabling a line-conditioning/test device, that is normally connected to a first type of central office switch via respective leads of a test interface of said first type of central office switch, to be coupled to and communicate with the respective ports of a multi-lead interface of a second type of central office switch that is not equipped with said test interface, so that conditioning and/or testing of subscriber telephone lines served by said second type of central office switch may be carried out, said test interface adapter comprising first interface ports that are directly connectable to said multi-lead interface of said second type of central office switch, second interface ports that are directly connectable to leads of said line-conditioning/test device, and a lead condition mapping mechanism which is coupled to each of said first and second interface ports, and is operative to map, to said first interface ports, electrical input conditions, asserted at said second interface ports by said line conditioning/test device, into electrical output conditions to which said second type of central office switch is responsive, and to map, to said second interface ports, electrical input conditions, asserted at said first interface ports by said second type of central office switch, into electrical output conditions expected to be presented to said line conditioning/test device by said test interface.

2. A test interface adapter according to claim 1, wherein said test interface comprises a no-test trunk having respective tip (T), ring (R), sleeve (S) and ground (G) leads.

3. A test interface adapter according to claim 2, wherein said respective ports of a multi-lead interface of said second type of central office switch include A, B, C, D and G (ground) leads.

4. A test interface adapter according to claim 2, wherein said respective ports of a multi-lead interface of said second type of central office switch include A, B, S, S1, S2, SL, BL and G (ground) leads.

5. A test interface adapter according to claim 2, wherein said lead condition mapping mechanism comprises a no-test trunk interface emulator unit, which is ported to respective T, R, S and G leads of said test interface adapter and appears to said line-conditioning/test device as said no-test trunk.

6. A test interface adapter according to claim 5, wherein said no-test trunk interface emulator unit includes a battery voltage conditioning unit, coupled to said T and R leads, and being operative to controllably provide no-test trunk battery and battery reversal to, and to controllably remove battery voltage from, said T and R leads.

7. A test interface adapter according to claim 5, wherein said no-test trunk interface emulator unit further includes a battery current flow sensor for detecting an off-hook condition, coupled to said T and R leads.

8. A test interface adapter according to claim 7, wherein said respective ports of a multi-lead interface of said second type of central office switch include A, B, C, D, S, S1, S2, SL, BL and G (ground) leads.

9. A test interface adapter according to claim 8, further including an A/B lead cut-through unit, coupled to said A and B leads and to said battery voltage conditioning unit, and being operative to controllably couple said battery voltage conditioning unit to said A and B leads.

10. A test interface adapter according to claim 9, further including a tone detector coupled to said A and B leads for monitoring respective tone cadences generated by said second type of central office switch.

11. A test interface adapter according to claim 2, further including a no-test trunk sleeve termination and sleeve current level sensor unit, which controllably monitors current flowing through said sleeve lead and provides a coded output representative of the magnitude of the sleeve current.

12. A test interface adapter according to claim 11, wherein said no-test trunk sleeve termination and sleeve current level sensor unit includes a terminating resistor, that is controllably placed in circuit with said S sleeve lead.

13. A test interface adapter according to claim 12, wherein said no-test trunk sleeve termination and sleeve current level sensor unit further includes a threshold comparator circuit, coupled to monitor said current flowing through said sleeve lead and providing said coded output representative of the magnitude of the sleeve current, within specified ranges.

14. A test interface adapter according to claim 13, wherein said respective ports of a multi-lead interface of said second type of central office switch include A, B, C, D, S, S1, S2, SL, BL and G (ground) leads.

15. A test interface adapter according to claim 14, wherein said test interface adapter includes a ground connection unit, which is operative to controllably place a ground condition of any of said C, D, S, S1 and S2 leads.

16. A test interface adapter according to claim 15, wherein said test interface adapter further includes an SL and BL ground detector unit, coupled to each of said SL and BL leads, and being operative to monitor the electrical states of said SL and BL leads.

17. A test interface adapter according to claim 16, wherein said SL and BL ground detector unit is operative to monitor whether said SL and BL leads are open or grounded, and to provide prescribed logic levels representative thereof.

18. A test interface adapter according to claim 16, wherein said no-test trunk interface emulator unit includes a battery voltage conditioning unit, coupled to said T and R leads, which is operative to controllably provide no-test trunk battery and battery reversal to, and to controllably remove battery voltage from, said T and R leads.

19. A test interface adapter according to claim 18, wherein said no-test trunk interface emulator unit further includes a battery current flow sensor for detecting an off-hook condition, coupled to said T and R leads.

20. A test interface adapter according to claim 19, further including an A/B lead cut-through unit, coupled to said A and B leads and to said battery voltage conditioning unit, and being operative to controllably couple said battery voltage conditioning unit to said A and B leads.

21. A test interface adapter according to claim 4, further including a cadence detector coupled to selected ones of the leads of said multi-lead interface of said second type of central office switch and being operative to monitor a pattern of signals provided by said second type of central office switch on said selected ones of said leads in order to determine the cadence thereof.

22. A test interface adapter according to claim 21, wherein said cadence detector comprises one or more tables containing respective cadence entries with which a respective pattern of signals provided by said second type of central office switch on said selected ones of said leads is compared in order to identify the cadence of said respective pattern.

23. A test interface adapter according to claim 21, wherein said cadence detector is coupled to said SL and BL leads, and is operative to monitor the electrical states of said SL and BL leads, and to derive therefrom an output representative of said pattern of signals provided on said SL and BL leads by said second type of central office switch in order to determine the cadence thereof.

24. A test interface adapter according to claim 22, wherein said cadence detector comprises one or more tables containing respective cadence entries with which a respective pattern of electrical states of said SL and BL leads provided by said second type of central office switch is compared in order to identify the cadence of said respective pattern.

25. A test interface adapter according to claim 21, wherein said cadence detector includes a tone detector coupled to said A and B leads for monitoring tone signals generated by said second type of central office switch, said tone detector being operative to derive therefrom an output representative of a pattern of tone signals provided by said second type of central office switch in order that the cadence of said tone signals may be determined.

26. A test interface adapter according to claim 25, wherein said cadence detector comprises one or more tables containing respective cadence entries with which a respective pattern of tone signals provided by said second type of central office switch on said A and B leads is compared in order to identify the cadence of said respective pattern of tone signals.

27. A test interface adapter according to claim 21, wherein said cadence detector comprises a cadence tokenizer, which is operative to translate the state of the monitored pattern of signals into a stream of tokens contained in one or more cadence tables, and a cadence parser, which is operative to examine parser states represented by said one or more tokens.

28. A test interface adapter according to claim 27, wherein said cadence tokenizer is operative to convert the monitored signal pattern into pulse tokens associated with first, relatively short periods of time during which two state transitions in said monitored signal pattern occur, and level tokens associated with relatively long periods of time longer than said relatively short periods of time, during which no state transitions in said monitored signal pattern occur.

29. A test interface adapter according to claim 28, wherein said cadence parser is invoked by the cadence tokenizer to analyze tokens produced by said cadence tokenizer, representing the state of the monitored signal pattern, and to generate an output in response to recognizing a predefined cadence.

30. A test interface adapter according to claim 29, wherein said cadence parser is operative to search a cadence table to identify a cadence from a plurality of tokens by operating a table-driven state machine, said state machine determining action to be taken by searching said cadence table for the presence of an entry corresponding to that for a respective token.

31. A test interface adapter according to claim 30, wherein said cadence table lists tokens acceptable within each state, together with action to be taken upon recognition of said token within the indicated state.

* * * * *